United States Patent
Sun

(10) Patent No.: US 9,988,299 B2
(45) Date of Patent: Jun. 5, 2018

(54) GLASS COMPOSITION

(71) Applicant: CDGM GLASS CO., LTD, Chengdu, Sichuan (CN)

(72) Inventor: Wei Sun, Chengdu (CN)

(73) Assignee: CDGM GLASS CO., LTD, Sichuan (CN)

( * ) Notice: Subject to any disclaimer, the term of this patent is extended or adjusted under 35 U.S.C. 154(b) by 0 days. days.

(21) Appl. No.: 15/109,263

(22) PCT Filed: Jan. 8, 2015

(86) PCT No.: PCT/CN2015/070359
§ 371 (c)(1),
(2) Date: Jun. 30, 2016

(87) PCT Pub. No.: WO2015/106650
PCT Pub. Date: Jul. 23, 2015

(65) Prior Publication Data
US 2016/0326043 A1 Nov. 10, 2016

(30) Foreign Application Priority Data

Jan. 16, 2014 (CN) .......................... 2014 1 0020496

(51) Int. Cl.
*C03C 3/19* (2006.01)
*C03C 4/08* (2006.01)
*C03C 3/17* (2006.01)
*G02B 5/20* (2006.01)
*G02B 5/22* (2006.01)
*G02B 27/00* (2006.01)

(52) U.S. Cl.
CPC .................. *C03C 3/19* (2013.01); *C03C 3/17* (2013.01); *C03C 4/082* (2013.01); *G02B 5/208* (2013.01); *G02B 5/226* (2013.01); *G02B 27/0025* (2013.01); *C03C 2204/00* (2013.01)

(58) Field of Classification Search
CPC .... C03C 3/16; C03C 3/17; C03C 3/19; C03C 4/08; C03C 4/082
See application file for complete search history.

(56) References Cited

U.S. PATENT DOCUMENTS

| | | | | |
|---|---|---|---|---|
| 5,173,212 A | 12/1992 | Spelt et al. | | |
| 5,750,448 A | * 5/1998 | Grabowski | ............... | C03C 3/17 501/44 |
| 2005/0054511 A1 | * 3/2005 | Fujiwara | ................... | C03B 7/12 501/45 |
| 2007/0099787 A1 | 5/2007 | Hayden et al. | | |
| 2013/0105744 A1 | * 5/2013 | Ogawa | ................... | C03B 32/00 252/587 |

FOREIGN PATENT DOCUMENTS

| | | |
|---|---|---|
| CN | 1911844 A | 2/2007 |
| JP | H01-167257 A | 6/1989 |
| JP | H01-242440 A | 9/1989 |
| JP | H03-8741 A | 1/1991 |

OTHER PUBLICATIONS

Machine Translation of JP H01-242440, Sep. 27, 1989. (Year: 1989).*
Apr. 13, 2015 Search Report issued in International Patent Application No. PCT/CN2015/070359.

* cited by examiner

*Primary Examiner* — Elizabeth A. Bolden
(74) *Attorney, Agent, or Firm* — Oliff PLC

(57) ABSTRACT

The invention provides a glass composition with stronger bending strength and excellent transmission property in the visible range, containing the following cations with a total weight of over 90%: $P^{5+}$, $Al^{3+}$, $B^{3+}$, $R1^+$, $R^{2+}$ and $Cu^{2+}$, wherein the content of $Cu^{2+}$ is 0.1-15%; the ratio of $Cu^{2+}/(P^{5+}+Al^{3+})$ is 0.01-0.15; the content of the anion $O^{2-}$ contained in the glass composition is up to over 97%; the bending strength of the glass composition is over 110 MPa; when the thickness of the glass composition is 0.3 mm, the spectral transmittance is more than or equal to 80% at a wavelength of 400 nm, the spectral transmittance is less than or equal to 25% at a wavelength of 700 nm, and the spectral transmittance is less than or equal to 25% at a wavelength of 1200 nm.

14 Claims, 1 Drawing Sheet

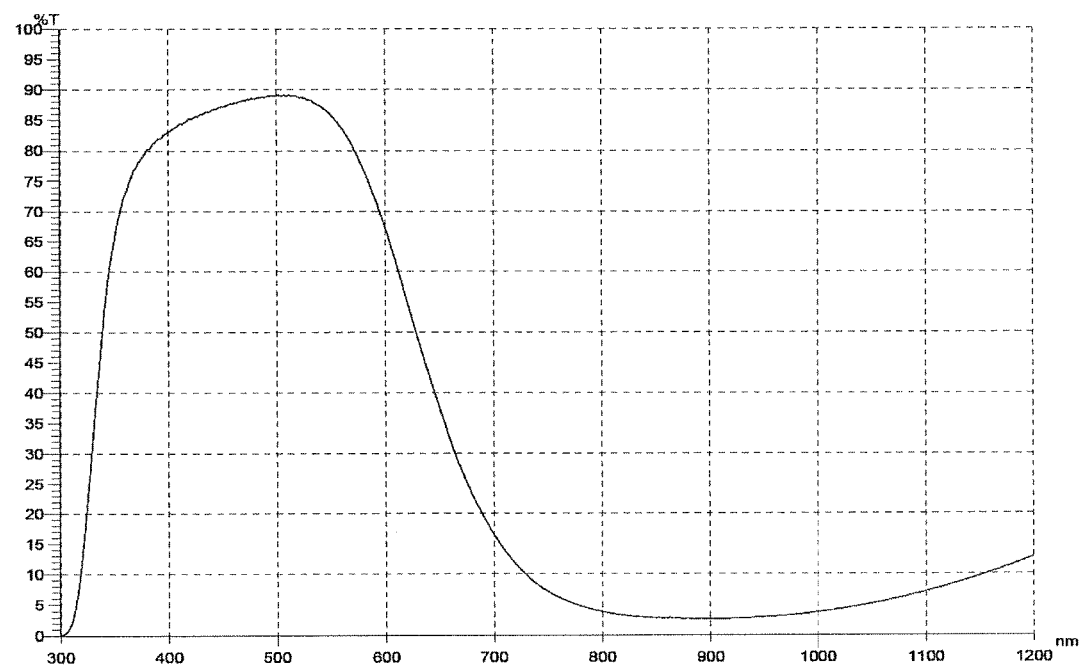

GLASS COMPOSITION

TECHNICAL FIELD

The invention relates to a near-infrared light absorbing glass composition, in particular to a near-infrared light absorbing glass composition with excellent bending strength used for a near-infrared light absorbing filter applicable to the correction of chromatic sensitivity.

BACKGROUND

In recent years, the spectral sensitivity of semiconductor camera elements, such as CCD and CMOS, used for digital camera and VTR camera, has been popularized to the near-infrared field nearby 1100 nm from the visible region. Therefore, the approximately visual feeling can be enjoyed by applying a filter to absorb the light in the near-infrared field. Therefore, the demand for filters for correction of chromatic sensitivity is growing, thus resulting in higher requirements on near-infrared light absorbing glass used to manufacture such filters. In other words, such glass composition is required to have an excellent transmittance in the visible region. Moreover, owning to the application of the near-infrared light absorbing glass in the field of smart phones, higher requirements is also proposed for the bending strength of the glass. After testing, the bending strength ($\sigma$) of the glass is about 60 MPa. Thus, in case of being easily damaged or broken due to falling to the ground or knocking during use, the requirements on the glass strength by terminal products, such as a mobile phone, cannot be met well.

SUMMARY

The technical problem to be solved by the present invention is to provide a near-infrared light absorbing glass with stronger bending strength and excellent transmittance in visible region.

To solve the technical problem, the present invention provides a glass composition. The glass composition contains the following cations with a total weight of over 90%: $P^{5+}$, $Al^{3+}$, $B^{3+}$, $R1^+$, $R^{2+}$ and $Cu^{2+}$, wherein the $R1^+$ represents one or more of $Li^+$, $Na^+$ and $K^+$; the $R^{2+}$ represents one or more of $Mg^{2+}$, $Ca^{2+}$, $Sr^{2+}$ and $Ba^{2+}$; the content of the $Cu^{2+}$ is 0.1-15%; the ratio of $Cu^{2+}/(P^{5+}+Al^{3+})$ is 0.01-0.15; the content of the anion $O^{2-}$ contained in the glass composition is up to over 97%; the bending strength of the glass composition is over 110 MPa; when the thickness of the glass composition is 0.3 mm, the spectral transmittance is more than or equal to 80% at a wavelength of 400 nm, the spectral transmittance is less than or equal to 25% at a wavelength of 700 nm, and the spectral transmittance is less than or equal to 25% at a wavelength of 1200 nm; when the thickness of the glass composition is 0.3-0.35 mm, the wavelength ranges from 620 to 650 nm if the spectral transmittance is 50%.

Furthermore, the bending strength of the glass composition is over 130 MPa; when the thickness of the glass composition is 0.3 mm, the spectral transmittance is more than or equal to 82% at a wavelength of 400 nm, the spectral transmittance is less than or equal to 20% at a wavelength of 700 nm, and the spectral transmittance is less than or equal to 16% at a wavelength of 1200 nm, when the thickness of the glass composition is 0.3-0.35 mm, the wavelength range ranges from 630 to 640 nm if the spectral transmittance is 50%.

Furthermore, the cations contain 50-75% of $P^{5+}$, 5-30% of $Al^{3+}$ and 0-15% of $B^{3+}$, wherein the content of $R1^+$ is greater than 0 but less than 10%, and the content of $R^{2+}$ is 0-10%.

Furthermore, the ratio of $Cu^{2+}/(P^{5+}+Al^{3+})$ ranges from 0.01 to 0.1.

Furthermore, the total content of $Al^{3+}$ and $B^{3+}$ is 5-45%.

Furthermore, less than 10% of $Li^+$, 0-5% of $Na^+$ and 0-5% of $K^+$ are contained.

Furthermore, 0-10% of $Mg^{2+}$, 0-10% of $Ca^{2+}$, 0-8% of $Sr^{2+}$ and 0-8% of $Ba^{2+}$ are contained.

Furthermore, less than 10% of $Zn^{2+}$ is contained.

Furthermore, less than 8% of $A^{4+}$, less than 8% of $D^5$ and less than 8% of $E^{3+}$ are contained, wherein $A^{4+}$ represents one or more of $Si^{4+}$, $Ge^{4+}$ and $Zr^{4+}$; $D^{5+}$ represents one or more of $Nb^{5+}$, $Ta^{5+}$ and $Gd^{5+}$; $E^{3+}$ represents one or more of $La^{3+}$ and $Y^{3+}$.

Furthermore, 0-1% of $Sb^{3+}$ is contained.

Furthermore, more than 99% of anion $O^{2-}$ is contained.

Furthermore, less than 3% of anion $Hal^-$ is contained, wherein $Hal^-$ represents one or more of $F^-$, $Cl^-$, $Br^-$ and $I^-$.

Furthermore, the climate resistance of the glass composition reaches over Level 2.

A glass composition, containing the following cations: 50-75% of $P^{5+}$; 5-30% of $Al^{3+}$; 0-15% of $B^{3+}$; more than 0 but less than 10% of $R1^+$; 0-10% of $R^{2+}$; and 0.1-15% of $Cu^{2+}$, wherein the $R1^+$ represents one or more of $Li^+$, $Na^+$ and $K^+$; the $R^{2+}$ represents one or more of $Mg^{2+}$, $Ca^{2+}$, $Sr^{2+}$ and $Ba^{2+}$; the content of the anion $O^{2-}$ is over 97%.

Furthermore, containing: 55-75% of $P^{5+}$, and further containing 60-70% of $P^{5+}$.

Furthermore, containing: 10-30% of $Al^{3+}$, and further containing 12-25% of $Al^{3+}$.

Furthermore, containing: 2-10% of $B^{3+}$, and further containing 3-8% of $B^{3+}$ Furthermore, containing $R1^+$ of more than 0 but less than 8%, and further containing $R1^+$ of more than 0 but less than 6%.

Furthermore, less than 10% of $Li^+$, 0-5% of $Na^+$ and 0-5% of $K^+$ are contained.

Furthermore, containing 0.5-8% of $Li^+$, and further containing 1-6% of $Li^+$.

Furthermore, containing 0-6% of $R^{2+}$, and further containing 0.1-5% of $R^{2+}$.

Furthermore, 0-10% of $Mg^{2+}$, 0-10% of $Ca^{2+}$, 0-8% of $Sr^{2+}$ and 0-8% of $Ba^{2+}$ are contained.

Furthermore, containing 0-6% of $Mg^{2+}$, and further containing 0.1-5% of $Mg^{2+}$.

Furthermore, containing 0.5-12% of $Cu^{2+}$, and further containing 0.5-10% of $Cu^{2+}$.

Furthermore, containing more than 99% of anion $O^{2-}$, and further containing 100% of $O^{2-}$.

Furthermore, the ratio range of $Cu^{2+}/(P^{5+}+Al^{3+})$ is 0.01-0.15, the ratio range of $Cu^{2+}/(P^{5+}+Al^{3+})$ is further 0.01-0.1, and the ratio range of $Cu^{2+}/(P^{5+}+Al^{3+})$ is more further 0.02-0.08.

Furthermore, the total amount of $Al^{3+}$ and $B^{3+}$ is 5-45%, the total amount of $Al^{3+}$ and $B^{3+}$ is further 12-35%, and the total amount of $Al^{3+}$ and $B^{3+}$ is more further 20-30%.

Furthermore, containing less than 10% of $Zn^{2+}$, and further containing less than 5% of $Zn^{2+}$.

Furthermore, less than 8% of $A^{4+}$, less than 8% of $D^5$ and less than 8% of $E^{3+}$ are contained, wherein $A^{4+}$ represents one or more of $Si^{4+}$, $Ge^{4+}$ and $Zr^{4+}$; $D^{5+}$ represents one or more of $Nb^{5+}$, $Ta^{5+}$ and $Gd^{5+}$; $E^{3+}$ represents one or more of $La^{3+}$ and $Y^{3+}$.

Furthermore, the total weight of cations $P^{5+}$, $Al^{3+}$, $B^{3+}$, $R1^+$, $R^{2+}$ and $Cu^{2+}$ contained in the glass composition reaches over 90%, further over 95%, and more further over 98%.

Furthermore, 0-1% of $Sb^{3+}$ is contained.

Furthermore, less than 3% of anion $Hal^-$ is contained, wherein $Hal^-$ represents one or more of $F^-$, $Cl^-$, $Br^-$ and $I^-$.

Furthermore, the bending strength of the glass composition reaches more than 110 MPa.

Furthermore, when the thickness of the glass composition is 0.3 mm, the spectral transmittance is more than or equal to 80% at a wavelength of 400 nm, the spectral transmittance is less than or equal to 25% at a wavelength of 700 nm; the spectral transmittance is less than or equal to 25% at a wavelength of 1200 nm; when the thickness of the glass composition is 0.3-0.35 mm, the wavelength ranges from 620 nm to 650 nm if the spectral transmittance reaches 50%.

Furthermore, the climate resistance of the glass composition reaches over Level 2.

The near-infrared light absorbing element is formed of the above-mentioned glass composition.

The near-infrared light absorbing filter is formed of the above-mentioned glass composition.

The advantageous effects of the present invention are as follows: the present invention, by taking the phosphate glass as the matrix glass, can effectively improve the bending strength ($\sigma$) of the near-infrared light absorbing glass through the reasonable design of the content of cations $Al^{3+}$ and $B^{3+}$ in the glass composition, to make the bending strength of the glass above 110 MPa; by introducing appropriate content of cations $R1^+$ and $R^{2+}$ in the phosphate matrix glass, the melting temperature of the molten glass can be reduced effectively when the bending strength of the glass is strengthened, and it helps the Cu ion keep bivalent, so as to make the absorbing performance of the near-infrared light to be excellent. When the glass thickness in the present invention is 0.3 mm, the transmittance is more than 80% at a wavelength of 400 nm, the spectral transmittance is less than or equal to 25% at a wavelength of 700 nm, and the spectral transmittance is less than or equal to 25% at a wavelength of 1200 nm; when the glass thickness is 0.3-0.35 mm, the wavelength ranges from 620 nm to 650 nm if the spectral transmittance reaches 50%.

BRIEF DESCRIPTION OF THE DRAWINGS

FIG. 1 is a curve graph for transmittance spectrum of the glass in Embodiment 9 of the present invention.

DETAILED DESCRIPTION

The near-infrared light absorbing glass provided by the invention is obtained through using the phosphate glass composition as the basis, and adding $Cu^{2+}$ capable of absorbing the near-infrared light into the cation in the glass component.

The content of cation hereinafter is represented by the weight percentage of said cation in the total cations, and the content of anion hereinafter is represented by the weight percentage of said anion in the total anions.

As an elementary component of the cation in the phosphate glass composition, $P^{5+}$ is an essential component for realizing absorption in the infrared region. When its content is less than 50%, the absorbing effect of the near-infrared light of the glass decreases, and the chromatic correction is liable to be poor and the color is liable to become green; when its content is more 75%, both the climate resistance and the devitrification resistance of the glass are liable to be degraded. Therefore, the content of $P^{5+}$ is limited as 50-75%, preferably 55-75%, more preferably 60-70%.

As a main component of the cation in the phosphate glass composition in the present invention, $Al^{3+}$ can improve the bending strength of the phosphate glass and the climate resistance of the glass. When the content of $Al^{3+}$ is less than 5%, the preceding effects are unavailable; however, if the content of $Al^{3+}$ exceeds 30%, the glass will be refractory, and the near-infrared light absorption property will be weakened. Thus, the content of $Al^{3+}$ is 5-30%, preferably 10-30%, more preferably 12-25%.

Copper in the glass provided by the present invention is a key indicator of the near-infrared light absorption property, which exists in the form of $Cu^{2+}$ in the glass. When the content of $Cu^{2+}$ is less than 0.1%, the near-infrared light absorbing filter cannot fully realize the required near-infrared light absorption effect; however, if the content exceeds 15%, both the devitrification resistance and the glass forming property will be weakened. Thus, the content of $Cu^{2+}$ is 0.1-15%, preferably 0.5-12%, more preferably 0.5-10%.

Through adjusting the ratio of the total amount of $Cu^{2+}$, $P^{5+}$ and $Al^{3+}$ in the glass composition in the present invention, the needed near-infrared light absorption spectral property of the glass in the present invention is obtained, which means to adjust the ratio range of $Cu^{2+}/(P^{5+}+Al^{3+})$ into 0.01-0.15, preferably 0.01-0.1, more preferably 0.02-0.08.

The present invention introduces appropriate amount of $B^{3+}$ which can reduce the melting temperature of the glass. When the content of $B^{3+}$ exceeds 15%, the absorption property of the near-infrared light will be weakened. Thus, the content of $B^{3+}$ is 0-15%, preferably 2-10%, more preferably 3-8%.

Through the experiment, the inventor finds that, the preferable mixed melting of $Al^{3+}$ and $B^{3+}$ will have better effect for the bending strength and climate resistance of the glass. The combined content of $Al^{3+}$ and $B^{3+}$ in the present invention is preferably 5-45%, more preferably 12-35%, and best preferably 20-30%.

At least one alkali metal $R1^+$ is contained in the present invention to flux when glass is molten so as to improve the fusibility and the glass forming property of the glass, wherein $R1^+$ represents one or more of $Li^+$, $Na^+$ and $K^+$. The appropriate introduction of $R1^+$ helps the existence of $Cu^{2+}$, but if the content of $R1^+$ exceeds 10%, the bending strength of the glass will be decreased obviously. Therefore, the content of $R1^+$ is more than 0 but less than 10%, preferably more than 0 and less than 8%, more preferably more than 0 and less than 6%.

The near-infrared light absorbing filter is expected to have a higher transmittance in the visible region. To improve the transmittance in the visible region, copper ions are required to be introduced in the glass in the form of $Cu^{2+}$ rather than $Cu^+$. In case that the molten glass is in a reduced status, $Cu^{2+}$ is liable to be reduced to $Cu^+$, which will result in transmittance reduction of the glass near the wavelength of 400 nm. With respect to $Na^+$ and $K^+$, the introduction of $Li^+$ can not only be good for the climate resistance of the glass, but also help the reduction of the melting temperature of the glass and make for the glass metal keeping oxidation state, so as to keep Cu ion divalent and improve the spectral property of the glass. However, when the content of $Li^+$ exceeds 10%, the climate resistance and bending strength of the glass will be weakened. Thus, the content of $Li^+$ is less than 10%, preferably 0.5-8%, more preferably 1-6%.

The content of $Na^+$ and $K^+$ in the present invention is respectively 0-5%, and if the content of $Na^+$ or $K^+$ exceeds 5%, the climate resistance and processability of the glass will decrease, so the preferred content is respectively 0-3%.

$R^{2+}$ is a component capable of effectively improving the glass forming property, devitrification resistance and workability of the glass, and $R^{2+}$ here represents one or more of $Mg^{2+}$, $Ca^{2+}$, $Sr^{2+}$ and $Ba^{2+}$. The appropriate content of $R^{2+}$ is introduced in the present invention to increase the alkaline content of the molten glass and make for the glass keeping oxidation state, and further to prevent reducing $Cu^{2+}$ to $Cu^+$, thus realizing excellent near-infrared light absorption property of the glass. If the content of $R^{2+}$ exceeds 10%, both the climate resistance and the strength of the glass will be weakened. Therefore, the content of $R^{2+}$ is 0-10%, preferably 0-6%, more preferably 0.1-5%.

Compared with $Sr^{2+}$ and $Ba^{2+}$, one or more of $Mg^{2+}$ and $Ca^{2+}$ is preferably introduced in the present invention to make better action effects of the component. The preferred content of $Mg^{2+}$ is 0-10%, more preferably 0-6%, best preferably 0.1-5%; the preferred content of $Ca^{2+}$ is 0-10%, more preferably 0-6%, best preferably 0.1-5%; the preferred content of $Sr^{2+}$ is 0-8%, more preferably 0-5%, best preferably 0-3%; the preferred content of $Ba^{2+}$ is 0-8%, more preferably 0-5%, best preferably 0-3%.

In the present invention, an appropriate content of $Zn^{2+}$ can also be added to strengthen the melting stability and climate resistance of the glass. However, excessive addition will deteriorate the climate resistance and the bending strength of the glass. Thus, the content of $Zn^{2+}$ in the present invention is less than 10%, preferably less than 5%. In the special mode of implementation, there is no $Zn^{2+}$ contained in the glass in the present invention.

In the present invention, it is also considered to add appropriate cations $A^{4+}$, $D^{5+}$ and $E^{3+}$, wherein $A^{4+}$ represents one or more of $Si^{4+}$, $Ge^{4+}$ and $Zr^{4+}$, $D^{5+}$ represents one or more of $Nb^{5+}$, $Ta^{5+}$ and $Gd^{5+}$, $E^{3+}$ represents one or more of $La^{3+}$ and $Y^{3+}$, and the introduction of small content of $A^{4+}$, $D^{5+}$ and $E^{3+}$ can be used to adjust the glass constant or the melting property, and if added, its content shall be respectively less than 8%.

The total weight of preferred cations $P^{5+}$, $Al^{3+}$, $B^{3+}$, $R1^+$, $R^{2+}$ and $Cu^{2+}$ of this invention is over 90%, more preferably over 95%, and most preferably over 98%.

As the clarifying agent, preferably, $Sb^{3+}$ can be added in the glass, with the content not more than 1%, and preferably not over 0.5%. Additionally, polyvalent oxide may affect the oxidation and reduction, furthering promoting the formation of $Cu^{2+}$. However, $Sb^{3+}$ is not included in the preferred embodiments of the glass for considering that $Sb^{3+}$ has certain influence on the environment.

The glass provided by the present invention contains anion $O^{2-}$. The content of $O^{2-}$ reaches more than 97% of the total weight of anions, preferably more than 99%, more preferably 100%.

A little amount of $Hal^-$ can also be introduced in the present invention. Here $Hal^-$ represents one or more of $F^-$, $Cl^-$, $Br^-$ and $I^-$. As an anion of the glass composition, $H^-$ if improves the climate resistance of the glass, with the content less than 3%, preferably less than 1%, more preferably 0%.

In order to produce the glass of the present invention, the raw materials can be introduced in the form of metaphosphate, carbonate, nitrate and oxide.

Based on the specific component design, the glass provided by the invention has the following features in the bending strength: the bending strength (σ) is available to be over 110 MPa, preferably over 130 MPa, more preferably over 150 MPa, and most preferably over 190 MPa.

The bending strength of the glass component provided by the present invention is tested by applying three-point method under the normal temperature with the microcomputer control electronic universal testing machine (type: CMT 6502). Three-point bending strength test refers to: the maximum bending stress of sample breaking when the sample is put on the two fulcrums with a certain distance and is loaded on a point of the center of the fulcrums.

Calculation of the bending strength:
Three-point bending strength:

$$\sigma_{(3.L)} = \frac{3L \times F}{2Wt^2}$$

In the formula, $\sigma_{(3.L)}$: three-point bending strength (MPa);
L: spacing between the lower two fulcrums (mm);
F: maximum bending stress of sample breaking (N);
W: width of sample (mm);
t: thickness of sample (mm).

The glass provided by the present invention is processed into 50 mm*20 mm*0.3 mm (length*width*thickness), and the test conditions are as follows: the indenter diameter is Φ6 mm, the press speed is 1 mm/min and the spacing is 30 mm.

On climate resistance of the glass, deteriorated layers like "white spot" and "blushing" are produced on glass eroded by atmosphere. The erosion degree of the surface of the glass provided by the present invention can be determined according to the time having the corrosion spots by using an 80×-100× microscope to observe the glass surface. The glass composition provided by the present invention has the following features in climate resistance: the climate resistance (CR) stability category is available to over Level 2, preferably over Level 1, more preferably over Level 0.

The above climate resistance shall be measured and tested under the following standard atmospheric conditions:
Temperature: 15° C.-35° C.;
Relative humidity: 20% RH-80% RH;
Atmospheric pressure: air pressure of the test site.

During testing the climate resistance of the sample glass in the present invention, the size of the sample is processed into 30 mm*30 mm*10 mm; the two big sides are polished, while the other sides are finely polished; there shall be no stripes, bubbles and stones visible to the naked eyes.

The testing box (room) requires that the temperature in each measuring point shall not exceed ±2° C. of the specified temperature and the allowable difference of the relative humidity is ±5% RH. The secondary distilled water that meets GB/T6682 requirements is applied. The rate of temperature change shall not exceed 10° C./min.

Firstly, the glass sample is wiped clean and placed under normal testing atmospheric pressure until the temperature is stabilized, and then placed into a drier and tested after 24 h, but the standing time shall not exceed 72 h. The glass sample is washed by applying an ultrasonic cleaner or cleaned by a mixed solvent of macrofiber cotton, absolute ethyl alcohol that meets GB/T 678 requirements and diethyl ether (1:9) that meets GB/T 12591 requirements, and the check under 80×-100× microscope shall have no erosion marks.

The test sample shall be put in the testing box with saturated vapor environment where the relative humidity is 90%; heated to 40° C., maintained for 50 minutes; heated to 50° C. with another 10 minutes, maintained for 50 minutes; then cooled to 40° C. with another 10 minutes, maintained for 50 minutes; further heated to 50° C. with another 10 minutes, maintained for 50 minutes. As for such alternative circulating, there are at least 15 circulation periods. The sample is taken out after the test and is observed after putting indoors for 1 h. If there is no corrosion spot after 30 h, the test time shall be added until the occurrence of the corrosion spots. The 80×-100× microscope is applied to observe the glass surface and the classification is carried out according to the time having the corrosion spots, as specified in Table 1.

TABLE 1

Glass Climate Resistance Stability Category

| | Climate resistance (CR) stability category | | | | |
|---|---|---|---|---|---|
| | Level 0 | Level 1 | Level 2 | Level 3 | Level 4 |
| Time (h) | ≥240 h | >180 h | ≤180 h, but >90 h | ≤90 h, but >30 h | <30 h |

The transmittance properties of the glass provided by the present invention are as follows:

When the glass is 0.3 mm thick, the spectral transmittance has the following properties:

The spectral transmittance at the wavelength of 400 nm is more than or equal to 80%, preferably more than or equal to 82%, more preferably more than or equal to 84%.

The spectral transmittance at the wavelength of 700 nm is less than or equal to 25%, preferably less than or equal to 20%, more preferably less than or equal to 18%.

The spectral transmittance at the wavelength of 1200 nm is less than or equal to 25%, preferably less than or equal to 16%, more preferably less than or equal to 10%.

When the glass is 0.3-0.35 mm thick, the wavelength ($\lambda_{50}$) is 620-650 nm if the spectral transmittance is 50%, more preferably 630-640 nm, best preferably 630-635 nm.

The transmittance of the glass provided by the present invention is a value calculated with a spectrophotometer as per the preceding method. The glass sample is assumed to have two parallel planes polished optically, the light falls perpendicularly from one parallel plane and emerges from the other parallel plane, and then the transmittance will be obtained via dividing the intensity of emergent light by the intensity of incident light. The transmittance here is also called external transmittance.

The preceding property of the glass provided by the present invention can help well realize chromatic correction of semiconductor imaging elements such as CCD or CMOS.

The near-infrared light absorbing glass provided by the present invention can form the near-infrared light absorbing element, such as laminar glass elements or lenses applied in near-infrared light absorbing filters, which is suitable for chromatic correction of solid photographing elements, having good transmittance and climate resistance. The near-infrared light absorbing element formed by the near-infrared light absorbing glass can compose near-infrared light filter equipment, thus also having good transmittance and climate resistance.

Embodiments

The present invention will be described in more detail by the following reference examples. However, the present invention is not limited to said examples.

Metaphosphate compound, oxide, nitrate and carbonate are used as raw materials of the glass first. The optical glass provided by the present invention is obtained through the following steps: weighing said raw materials according to the proportions to make it become the glass having the anions and cations as shown in Table 2 and Table 3 and placing the mixed raw materials into a platinum crucible after mixing fully; maintaining oxidation atmosphere in furnace in process, benefiting the existence of $Cu^{2+}$; heating and stirring for melting at 1250 to 1350° C., and then enabling the molten glass to constantly flow out of the temperature-controlled pipe at a constant speed after settling and homogenizing to form the optical glass.

Embodiments 1 to 20 (embodiments of manufacturing the near-infrared light absorbing glass)

TABLE 2

| | | Embodiments | | | | | | | | | |
|---|---|---|---|---|---|---|---|---|---|---|---|
| | | 1 | 2 | 3 | 4 | 5 | 6 | 7 | 8 | 9 | 10 |
| Cation % | $P^{5+}$ | 55 | 67.5 | 72 | 66 | 67.9 | 57.4 | 66.5 | 70.2 | 67.2 | 68.3 |
| | $Al^{3+}$ | 22 | 18.4 | 14.4 | 19.5 | 18 | 22 | 18.9 | 11.8 | 17.6 | 15.6 |
| | $B^{3+}$ | 10 | 6.0 | 0 | 6.9 | 7.2 | 5.4 | 6.3 | 8.1 | 6.5 | 2.5 |
| | $Li^+$ | 5.5 | 3.3 | 1.2 | 3.1 | 1.8 | 2.2 | 3 | 6.4 | 3.5 | 0 |
| | $Na^+$ | 0 | 0 | 2 | 0 | 0 | 1 | 0 | 0 | 0 | 2.1 |
| | $K^+$ | 0 | 0 | 1.5 | 0 | 0 | 0.4 | 0 | 0 | 0 | 1.2 |
| | $Mg^{2+}$ | 0.5 | 1.0 | 4.1 | 1.2 | 0.9 | 0 | 1.8 | 2.3 | 1.2 | 0 |
| | $Ca^{2+}$ | 1.1 | 0 | 2 | 0 | 0 | 2.3 | 0 | 0 | 0 | 3 |
| | $Sr^{2+}$ | 0 | 0 | 0 | 0 | 0 | 0 | 0 | 0 | 0 | 0 |
| | $Ba^{2+}$ | 0 | 0 | 0 | 0 | 0 | 0.5 | 0 | 0 | 0 | 2.5 |
| | $Cu^{2+}$ | 5.1 | 3.8 | 2.8 | 3.3 | 4.2 | 4.6 | 3.5 | 3.0 | 4 | 4.8 |
| | $Zn^{2+}$ | 0.8 | 0 | 0 | 0 | 0 | 2 | 0 | 0 | 0 | 0 |
| | $Sb^{3+}$ | 0 | 0 | 0 | 0 | 0 | 0.2 | 0 | 0 | 0 | 0 |
| | $A^{4+}$ | 0 | 0 | 0 | 0 | 0 | 1.5 | 0 | 0 | 0 | 0 |
| | $D^{5+}$ | 0 | 0 | 0 | 0 | 0 | 0.5 | 0 | 0 | 0 | 0 |
| | $E^{3+}$ | 0 | 0 | 0 | 0 | 0 | 0 | 0 | 0 | 0 | 0 |
| Total (%) | | 100 | 100 | 100 | 100 | 100 | 100 | 100 | 100 | 100 | 100 |
| Anion (%) | $O^{2-}$ | 100 | 100 | 100 | 100 | 100 | 100 | 100 | 100 | 100 | 100 |
| | $Hal^-$ | 0 | 0 | 0 | 0 | 0 | 0 | 0 | 0 | 0 | 0 |
| Total (%) | | 100 | 100 | 100 | 100 | 100 | 100 | 100 | 100 | 100 | 100 |
| Bending strength (σ) MPa | | 160 | 179 | 128 | 196 | 189 | 165 | 182 | 143 | 160 | 144 |
| Climate resistance | | 0 | 0 | 2 | 0 | 0 | 0 | 0 | 0 | 0 | 0 |

TABLE 3

| | | \multicolumn{10}{c}{Embodiments} |
|---|---|---|---|---|---|---|---|---|---|---|---|
| | | 11 | 12 | 13 | 14 | 15 | 16 | 17 | 18 | 19 | 20 |
| Cation % | $P^{5+}$ | 58.3 | 54.5 | 71 | 64.4 | 66.9 | 60.2 | 67.3 | 69.3 | 65.2 | 67.3 |
| | $Al^{3+}$ | 14.8 | 16.4 | 13.7 | 18.2 | 17.2 | 18.3 | 17.2 | 15.5 | 18.1 | 18.6 |
| | $B^{3+}$ | 11.9 | 13.1 | 4.5 | 5.6 | 7.7 | 5.0 | 6.1 | 0 | 6.4 | 6.5 |
| | $Li^+$ | 0 | 5.8 | 0 | 3.7 | 1.6 | 6.9 | 3.1 | 4.4 | 3.4 | 2 |
| | $Na^+$ | 0 | 0 | 3.3 | 0 | 0.8 | 0 | 0 | 0 | 0 | 0 |
| | $K^+$ | 2 | 0 | 0 | 0 | 0 | 0 | 0 | 0 | 0 | 0 |
| | $Mg^{2+}$ | 0 | 3.0 | 0 | 2.2 | 0.7 | 1 | 2.8 | 5.3 | 1.7 | 1.5 |
| | $Ca^{2+}$ | 0.8 | 0 | 0 | 0 | 0.6 | 0 | 0 | 0 | 0 | 0 |
| | $Sr^{2+}$ | 2 | 0 | 0 | 0 | 0 | 0 | 0 | 0 | 0 | 0 |
| | $Ba^{2+}$ | 1.9 | 0 | 3 | 0 | 0 | 0 | 0 | 0 | 0 | 0 |
| | $Cu^{2+}$ | 4.4 | 5.2 | 2.8 | 4.4 | 4.5 | 2.6 | 3.5 | 2.7 | 3.2 | 3.1 |
| | $Zn^{2+}$ | 2.9 | 0 | 1.2 | 0 | 0 | 3.3 | 0 | 0 | 0 | 0 |
| | $Sb^{3+}$ | 0 | 0 | 0.5 | 0 | 0 | 0.2 | 0 | 0 | 0 | 0 |
| | $A^{4+}$ | 0 | 2 | 0 | 0 | 0 | 0.5 | 0 | 0 | 0 | 1 |
| | $D^{5+}$ | 0 | 0 | 0 | 1.5 | 0 | 0.5 | 0 | 3 | 0 | 0 |
| | $E^{3+}$ | 1 | 0 | 0 | 0 | 0 | 1.5 | 0 | 0 | 2 | 0 |
| Total (%) | | 100 | 100 | 100 | 100 | 100 | 100 | 100 | 100 | 100 | 100 |
| Anion % | $O^{2-}$ | 99.1 | 100 | 100 | 98.5 | 100 | 100 | 100 | 100 | 100 | 97.3 |
| | $Hal^-$ | 0.9 | 0 | 0 | 1.5 | 0 | 0 | 0 | 0 | 0 | 2.7 |
| Total (%) | | 100 | 100 | 100 | 100 | 100 | 100 | 100 | 100 | 100 | 100 |
| Bending strength ($\sigma$) MPa | | 146 | 150 | 154 | 162 | 174 | 153 | 165 | 129 | 168 | 192 |
| Climate resistance | | 1 | 0 | 0 | 0 | 0 | 1 | 0 | 2 | 0 | 0 |

The glass provided by the present invention is processed into plates, and two planes opposite to each other are subjected to optical polishing to prepare the samples for measuring the spectral transmittance. The spectral transmittance of each sample is measured with the spectrometer to acquire the transmittance of typical wavelength of each sample with the thickness of 0.3 mm.

Tables 4 to 5 illustrate the transmittance of the glass provided by the present invention in case the thickness is 0.3 mm, which indicates that the glass is excellent in chromatic correction of semiconductor imaging elements.

TABLE 4

| | | \multicolumn{10}{c}{Embodiments} |
|---|---|---|---|---|---|---|---|---|---|---|---|
| | | 1 | 2 | 3 | 4 | 5 | 6 | 7 | 8 | 9 | 10 |
| Transmittance % | 400 nm | 80.2 | 84.0 | 87.0 | 86.0 | 82.6 | 80.5 | 86.0 | 87.1 | 83.2 | 80.4 |
| | 700 nm | 23.6 | 15.0 | 19.7 | 16.2 | 14.2 | 22.4 | 16.5 | 18.8 | 14.3 | 21.8 |
| | 1200 nm | 20.9 | 13.0 | 21.3 | 16.6 | 12.3 | 19.7 | 16.8 | 20.3 | 12.3 | 17.6 |
| $\lambda_{50}$ (nm) | | 620 | 633 | 647 | 640 | 621 | 622 | 641 | 643 | 630 | 630 |

TABLE 5

| | | \multicolumn{10}{c}{Embodiments} |
|---|---|---|---|---|---|---|---|---|---|---|---|
| | | 11 | 12 | 13 | 14 | 15 | 16 | 17 | 18 | 19 | 20 |
| Transmittance % | 400 nm | 80.1 | 81.3 | 86.5 | 80.8 | 80.1 | 87.5 | 85.0 | 86.4 | 86.0 | 86.4 |
| | 700 nm | 14.0 | 20.0 | 20.0 | 23.6 | 23.6 | 21.6 | 15.7 | 19.9 | 22.3 | 22.4 |
| | 1200 nm | 12.2 | 17.2 | 22.4 | 21.9 | 19.0 | 23.2 | 14.8 | 21.9 | 15.4 | 16.8 |
| $\lambda_{50}$ (nm) | | 623 | 622 | 649 | 623 | 622 | 652 | 637 | 648 | 641 | 643 |

The curve graph for the spectral transmittance of the near-infrared light absorbing glass in Embodiment 9 of the present invention is shown in FIG. 1.

The invention claimed is:

1. A glass composition, containing the following cations with a total weight of over 98%: 55-75% of $P^{5+}$, 12-25% of $Al^{3+}$, 3-8% of $B^{3+}$, more than 0 and less than 6% of $R1^+$, 0 to 5% of $R^{2+}$ and 0.5 to 5.2% of $Cu^{2+}$, wherein the $R1^+$ represents one or more of $Li^+$, $Na^+$ and $K^+$; the $R^{2+}$ represents one or more of $Mg^{2+}$, $Ca^{2+}$, $Sr^{2+}$ and $Ba^{2+}$; the ratio of $Cu^{2+}/(P^{5+}+Al^{3+})$ is 0.01 to 0.07, and up to 2% optionally including at least one cation selected from the group consisting of $Zn^{2+}$, $A^{4+}$, $D^{5+}$, $E^{3+}$ and $Sb^{3+}$, wherein $A^{4+}$ represents one or more of $Si^{4+}$, $Ge^{4+}$ and $Zr^{4+}$; $D^{5+}$ represents one or more of $Nb^{5+}$, $Ta^{5+}$ and $Gd^{5+}$; $E^{3+}$ represents one or more of $La^{3+}$ and $Y^{3+}$, and wherein $Sb^{3+}$, if present, is present in an amount no greater than 1%; the content of the anion $O^{2-}$ contained in the glass composition is over 97%.

2. The glass composition according to claim 1, containing 0-5% of $Na^+$; 0-5% of $K^+$; and the remainder of $Li^+$.

3. The glass composition according to claim 1, containing 0.5 to less than 6% of $Li^+$.

4. The glass composition according to claim 1, containing at least one of $A^{4+}$; $D^{5+}$; $E^{3+}$.

5. The glass composition according to claim 1, containing $Sb^{3+}$.

6. The glass composition according to claim 1, containing more than 99% of anion $O^{2-}$.

7. The glass composition according to claim 1, containing less than 3% of anion $Hal^-$, wherein the $Hal^-$ represents one or more of $F^-$, $Cl^-$, $Br^-$ and $I^-$.

8. The glass composition according to claim 1, wherein the bending strength of the glass composition is over 130 MPa; when the thickness of the glass composition is 0.3 mm, the spectral transmittance is more than or equal to 82% at a wavelength of 400 nm, the spectral transmittance is less than or equal to 20% at a wavelength of 700 nm, and the spectral transmittance is less than or equal to 16% at a wavelength of 1200 nm; when the thickness of the glass composition is 0.3-0.35 mm, the wavelength range is 630-640 nm if the spectral transmittance is 50%.

9. The glass composition according to claim 1, wherein the bending strength of the glass composition reaches more than 110 MPa.

10. The glass composition according to claim 1, wherein when the thickness of the glass composition is 0.3 mm, the spectral transmittance is more than or equal to 80% at a wavelength of 400 nm, the spectral transmittance is less than or equal to 25% at a wavelength of 700 nm, and the spectral transmittance is less than or equal to 25% at a wavelength of 1200 nm; when the thickness of the glass composition is 0.3-0.35 mm, the wavelength range is 620-650 nm if the spectral transmittance is 50%.

11. The glass composition according to claim 1, wherein the climate resistance of the glass composition reaches over Level 2.

12. A near-infrared light absorbing element, which is formed by the glass composition according to claim 1.

13. A near-infrared light absorbing filter, which is formed by the glass composition according to claim 1.

14. The glass composition according to claim 1, containing $Zn^{2+}$.

* * * * *